United States Patent
Zhao et al.

(10) Patent No.: US 10,851,435 B2
(45) Date of Patent: Dec. 1, 2020

(54) DUAL-HARDNESS CLAD STEEL PLATE AND PRODUCTION METHOD THEREOF

(71) Applicant: BAOSHAN IRON & STEEL CO., LTD., Shanghai (CN)

(72) Inventors: Xiaoting Zhao, Shanghai (CN); Bao Yan, Shanghai (CN); Liandeng Yao, Shanghai (CN); Sihai Jiao, Shanghai (CN); Hongbin Li, Shanghai (CN)

(73) Assignee: Baoshan Iron & Steel Co., Ltd., Beijing (CN)

( * ) Notice: Subject to any disclaimer, the term of this patent is extended or adjusted under 35 U.S.C. 154(b) by 193 days.

(21) Appl. No.: 16/061,189

(22) PCT Filed: Dec. 14, 2016

(86) PCT No.: PCT/CN2016/109781
§ 371 (c)(1),
(2) Date: Jun. 11, 2018

(87) PCT Pub. No.: WO2017/101770
PCT Pub. Date: Jun. 22, 2017

(65) Prior Publication Data
US 2018/0363093 A1    Dec. 20, 2018

(30) Foreign Application Priority Data
Dec. 14, 2015    (CN) .......................... 2015 1 0926272

(51) Int. Cl.
*C21D 9/50* (2006.01)
*B32B 15/00* (2006.01)
(Continued)

(52) U.S. Cl.
CPC .............. *C21D 9/50* (2013.01); *B21B 1/38* (2013.01); *B32B 15/00* (2013.01); *B32B 15/011* (2013.01);
(Continued)

(58) Field of Classification Search
CPC . C21D 9/50; C21D 1/18; C21D 6/004; C21D 6/005; C21D 6/008; C21D 8/0205;
(Continued)

(56) References Cited

U.S. PATENT DOCUMENTS

| 3,694,174 A | 9/1972 | Briggs et al. |
| 2010/0257997 A1 | 10/2010 | Kucherov et al. |
| 2019/0024204 A1* | 1/2019 | Stefansson ............... B21B 1/22 |

FOREIGN PATENT DOCUMENTS

| CN | 2715093 A | 8/2005 |
| CN | 1686653 | 10/2005 |

(Continued)

OTHER PUBLICATIONS

MIL-FTL-32332 ("Armor Plate, Steel, Wrought, Ultra-High-Hardness," Published Jul. 2009) (Year: 2009).*

(Continued)

*Primary Examiner* — Anthony J Zimmer
*Assistant Examiner* — Ricardo D Morales
(74) *Attorney, Agent, or Firm* — Thomas Horstemeyer, LLP

(57) ABSTRACT

A dual-hardness clad steel plate. One surface of the steel plate is a high-hardness layer, the other surface of the steel plate is a low-hardness layer, and a combination of atoms is achieved between the high-hardness layer and the low-hardness layer by rolling bonding, wherein Mn13 steel is adopted for the low-hardness layer, and the Brinell hardness of the high-hardness layer is greater than 600. Further disclosed is a production method of the dual-hardness clad steel plate, comprising: 1) respectively preparing a high-hardness layer slab and a low-hardness layer slab; 2) assembling: preprocessing combined faces of the slabs, carrying out peripheral welded sealing on joint faces of the slabs, and carrying out vacuumizing treatment on a composite slab (Continued)

after welded sealing; 3) heating; 4) carrying out composite rolling; 5) cooling; and 6) carrying out thermal treatment, wherein the heating temperature is 1050-1100° C., the heating time is 2-3 min/mm×slab thickness, and water cooling is performed on the heated slab, and the water temperature is lower than 40° C. The steel plate has different hardness characteristics and good low-temperature toughness.

9 Claims, 1 Drawing Sheet

(51) Int. Cl.
| | |
|---|---|
| C21D 9/48 | (2006.01) |
| C21D 9/46 | (2006.01) |
| C21D 8/04 | (2006.01) |
| C21D 8/02 | (2006.01) |
| C21D 1/18 | (2006.01) |
| C21D 9/42 | (2006.01) |
| B21B 1/38 | (2006.01) |
| B32B 15/01 | (2006.01) |
| C21D 6/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/50 | (2006.01) |
| C22C 38/54 | (2006.01) |
| F41H 5/04 | (2006.01) |

(52) U.S. Cl.
CPC ............... *C21D 1/18* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0247* (2013.01); *C21D 8/0263* (2013.01); *C21D 8/0421* (2013.01); *C21D 8/0426* (2013.01); *C21D 8/0447* (2013.01); *C21D 8/0463* (2013.01); *C21D 9/42* (2013.01); *C21D 9/46* (2013.01); *C21D 9/48* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *C22C 38/54* (2013.01); *B21B 2001/383* (2013.01); *B21B 2001/386* (2013.01); *B32B 2307/536* (2013.01); *C21D 2211/001* (2013.01); *C21D 2211/008* (2013.01); *C21D 2251/02* (2013.01); *F41H 5/045* (2013.01)

(58) Field of Classification Search
CPC .. C21D 8/0226; C21D 8/0247; C21D 8/0263; C21D 8/0421; C21D 8/0426; C21D 8/0447; C21D 8/0463; C21D 9/42; C21D 9/46; C21D 9/48; B21B 1/38; B32B 15/00; B32B 15/011; C22C 38/02; C22C 38/04; C22C 38/06; C22C 38/42; C22C 38/44; C22C 38/50; C22C 38/54
See application file for complete search history.

(56) References Cited

FOREIGN PATENT DOCUMENTS

| | | | |
|---|---|---|---|
| CN | 101214497 | | 7/2008 |
| CN | 101215669 | | 7/2008 |
| CN | 101892443 | | 11/2010 |
| CN | 103348213 A | | 10/2013 |
| CN | 103451546 Y | | 12/2013 |
| CN | 103484599 | | 1/2014 |
| CN | 104501660 A | | 4/2015 |
| CN | 105088090 A | | 11/2015 |
| CN | 105088090 Y | | 11/2015 |
| CN | 105499269 | | 4/2016 |
| EP | 2123447 A1 | | 11/2009 |
| EP | 2465954 A1 | | 6/2012 |
| JP | H11343543 A | * | 12/1999 ............... C21D 6/00 |
| JP | 2010280127 | | 12/2010 |

OTHER PUBLICATIONS

Maweja et al. ("The design of advanced performance high strength low-carbon martensitic armour steels: microstructural considerations." Materials Science and Engineering: A 480.1-2 (2008): 160-166.) (Year: 2008).*
Ramachandran et al. ("Stabilization of Austenite by Hydrogen." Nature 187.4738 (1960): 684-685.) (Year: 1960).*
JPH11343543A translation ESPACENET. (Year: 1999).*
Chinella ("Processing and characterization of high strength, high ductility hadfield steel." US Army Materials Technology Laboratory. 1990. (Year: 1990).*
Chinese Search Report dated Feb. 3, 2017 for Chinese Patent Application No. 2015109262729.
Metallographic Technology Q & A (1987) Guo Xiuwen et al., National Defense Industry Press pp. 322-324.
Ordnance Material Science and Engineering, Issue 3 (2001) Fan Aiguo, Composite steel armor plate p. 29.
PCT/CN2016/109781 International Search Report and Written Opinion dated Mar. 15, 2017.
Korean Office Action dated Jun. 28, 2019 for co-pending KR Patent Application No. 10-2018-7018465, and its English translation.

* cited by examiner

DUAL-HARDNESS CLAD STEEL PLATE AND PRODUCTION METHOD THEREOF

CROSS-REFERENCE TO RELATED APPLICATIONS

This application is a 371 U.S. National Phase of PCT International Application No. PCT/CN2016/109781 filed on Dec. 14, 2016, which claims benefit and priority to Chinese patent application No. 201510926272.9, filed on Dec. 14, 2015. Both of the above-referenced applications are incorporated by reference herein in their entirety.

TECHNICAL FIELD

The present disclosure relates to a steel plate and a method of manufacturing the same, particularly to a clad steel plate and a method of manufacturing the same.

BACKGROUND ART

In general, increase of thickness and hardness grades of a steel plate helps upgrade the protection capability of an armored vehicle. Nevertheless, an increased thickness of the steel plate is undesirable for weight reduction of the vehicle, and affects tactical mobility of the vehicle. Meanwhile, if the hardness of the steel plate goes beyond a particular scope, spallation will occur when the steel plate is impinged by bullets or shells, and fragments thus generated will directly jeopardize personal safety and normal operation of instrumentation.

A Chinese patent literature, CN202750372U published on Feb. 20, 2013 and titled "New Bullet-proof Equipment Cabinet", discloses a cabinet body having a bullet-proof function. A bullet-proof armour is disposed on an exterior side of the cabinet body, wherein the bullet-proof armour is formed by bonding a 616 armour steel plate to a Kevlar composite plate, wherein the 616 armour steel plate is an outer layer of the bullet-proof armour, and the Kevlar composite plate is the inner layer of the bullet-proof armour. An 8 mm thick steel plate is used for the 616 armour steel plate of the outer layer, and a 7 mm thick steel plate is used for the Kevlar composite plate of the inner layer. However, this Chinese patent literature is silent on characteristics or comprehensive performances of related steel plate products.

Therefore, it's desired to obtain a steel plate which shall possess a very high hardness, and also be able to absorb large impact kinetic energy.

SUMMARY

One object of the invention is to provide a dual-hardness clad steel plate with two different surfaces having two different hardness properties. One surface of the dual-hardness clad steel plate has an ultra-high hardness, while another surface opposite to this surface has a relatively low hardness and a relatively high low-temperature toughness. The dual-hardness clad steel plate according to this disclosure realizes a combination of high hardness, low hardness and high toughness. In addition, the dual-hardness clad steel plate according to this disclosure exhibits superior machinability and excellent bullet-proof performance.

To achieve the above object, the present disclosure proposes a dual-hardness clad steel plate, one surface thereof being a high-hardness layer, another surface thereof being a low-hardness layer, atomic bonding being realized between the high-hardness layer and the low-hardness layer by rolling, wherein the low-hardness layer is Mn13 steel, and the high-hardness layer has a Brinell hardness of greater than 600.

In this technical solution, a low-hardness layer means it has a lower hardness in comparison with a high-hardness layer. In addition, since the low-hardness layer is Mn13 steel, its Brinell hardness is generally lower than 250.

In this technical solution, Mn13 steel refers to a steel with a Mn content being controlled in the range of 10%<Mn<20%, wherein the microstructure of this kind of steel is substantially a single austenite structure.

Further, the above high-hardness layer comprises the following chemical elements in mass percentage:
C: 0.35-0.45%;
Si: 0.80-1.60%;
Mn: 0.3-1.0%;
Al: 0.02-0.06%;
Ni: 0.3-1.2%;
Cr: 0.30-1.00%;
Mo: 0.20-0.80%;
Cu: 0.20-0.60%;
Ti: 0.01-0.05%;
B: 0.001-0.003%;
a balance of Fe and unavoidable impurities.

The various chemical elements in the above high-hardness layer are designed according the following principle: C: It may have a function of solid solution strengthening in steel, and it's a strengthening element that makes the greatest contribution to steel strength at the lowest cost. To achieve a particular level of hardness, it's desired to have a relatively high content of carbon in steel. However, an unduly high carbon content will have a negative impact on weldability and toughness of steel. As such, by balancing the strength and toughness of a steel plate, the carbon content in the high-hardness layer of the dual-harness clad steel plate according to the disclosure should be controlled in the range of 0.35-0.45%.

Si: Si is an element for removing oxygen. In addition, Si can dissolve in ferrite and has a function of solid solution strengthening. Silicon is only secondary to carbon, nitrogen, phosphorus and excels other alloy elements in this function. Therefore, Si can improve steel strength and hardness notably. If the solid solution strengthening function of Si is desired, the amount of Si to be added is generally not lower than 0.6%. In the above high-hardness layer, the Si content should be controlled in the range of 0.8-1.6% to effect solid solution strengthening.

Mn: Mn can reduce a critical cooling rate of steel, thereby promoting hardenability greatly, and it may have a solid solution strengthening effect on steel. However, an unduly high Mn content will result in a sharply decreased martensitic transformation temperature, leading to increased residual austenite at room temperature, which is undesirable for increasing steel strength. In addition, coarse MnS will be generated in a center segregation area of a casting blank, reducing toughness of a plate at the middle of its thickness. In view of the above, the Mn content in the above high-hardness layer should be controlled in the range of 0.3-1.0%.

Al: Al is also an element for removing oxygen. Meanwhile, Al can also form fine, insoluble AlN particles with nitrogen, thereby refining steel microstructure and inhibiting BN formation, so that B is still present in a solid solution state, which ensures steel hardenability. Nevertheless, once an Al content exceeds 0.06%, coarse alumina inclusions will form in steel. Therefore, the Al content in the high-hardness layer is controlled in the range of 0.02-0.06%.

Ni: Ni in steel only dissolves in matrix phase ferrite and austenite, and no carbide will form. It exhibits a strong effect in stabilizing austenite. Ni is a main element for ensuring high steel toughness. When the strengthening effect of Ni and the cost for its addition are taken into consideration, the Ni content in the high-hardness layer is set in the range of 0.3-1.2%.

Cr: Cr is an element for reducing an austenitic phase zone, and it's also a moderately strong carbide forming element. Cr is also soluble in ferrite. Cr can stabilize austenite, and shift a C curve to the right, thereby reducing a critical cooling rate, and thus improving steel hardenability. The Cr content in the above high-hardness layer should be controlled in the range of 0.3-1.0%.

Mo: As Mo in steel can be present in a solid solution phase and a carbide phase at the same time, Mo exhibits both effects of solid solution strengthening and carbide dispersion strengthening for steel, thereby acting to improve steel hardness and strength remarkably. As such, the Mo content in the above high-hardness layer should be controlled in the range of 0.20-0.80%.

Cu: Cu in steel is mainly present in a solid solution state and a precipitate state of elemental phase. Solid-dissolved Cu may have a function of solid solution strengthening. Since the solid solubility of Cu in ferrite decreases rapidly as temperature decreases, oversaturated solid-dissolved Cu will precipitate in the form of elementary substance at low temperatures, thereby introducing an effect of precipitation strengthening. Addition of Cu to the above high-hardness layer in an amount of 0.2-0.6% can improve atmospheric corrosion resistance of steel significantly.

Ti: Ti can form titanium carbide, titanium nitride or titanium carbonitride with C, N in steel, and thus has an effect of refining austenite grains at a stage of heating and rolling a steel blank, thereby improving steel strength and toughness. However, an unduly high Ti content will result in formation of a large amount of coarse titanium nitride in steel, having a negative impact on steel strength and toughness. According to the technical solution of the present disclosure, the Ti content in the above high-hardness layer should be controlled in the range of 0.01-0.05%.

B: Addition of B in a small amount can significantly improve steel hardenability, and allows for easy obtainment of a martensitic structure in steel. Nevertheless, it's undesirable to add too much B, because a relatively strong bonding force exits between B and a crystalline boundary, so that B tends to segregate at the crystalline boundary, thereby affecting the overall properties of the steel. As such, the B content in the above high-hardness layer should be controlled in the range of 0.001-0.003%.

The main unavoidable impurities in the high-hardness layer of the dual-hardness clad steel plate according to the disclosure are P and S.

Still further, the microstructure of the above high-hardness layer includes martensite and a small amount of residual austenite.

Still further, a proportion of the above residual austenitic phase is less than 1%.

Here, according to the technical solution of the disclosure, the microstructure of the high-hardness layer is controlled to be martensite and a small amount of residual austenite for the following reasons: residual austenite is a structure that will occur unavoidably when over-cooled austenite undergoes phase change after quenching, and strict control over the residual austenite helps ensure the properties of a particular type of steel; while in martensite, due to the solid solution strengthening effect of the carbon dissolved in a phase and the strengthening effect caused by the presence of a substructure of high density dislocations, martensite is characterized by high hardness. Hence, to guarantee high hardness of the high-hardness layer, nearly all of the microstructure needs to be controlled to be a martensitic structure.

Further, the above low-hardness layer comprises the following chemical elements in mass percentage:
C: 1.00-0.135%;
Si: 0.30-0.90%,
Mn: 11.0-19.0%,
Al: 0.02-0.06%,
a balance of Fe and other unavoidable impurities.

The various chemical elements in the above low-hardness layer are designed according the following principle:

C: C is an austenite stabilizing element, allowing for maintaining an austenitic structure to room temperature in the course of rapid cooling. Increase of a carbon content reinforces solid solution strengthening of steel, thereby improving strength and hardness of Mn13 steel. If the carbon content is too high, carbides in steel will dissolve in austenite during solid solution treatment. Because of the big difference between carbides and austenite in specific capacity, cavity defects will be incurred in high manganese steel after solid solution treatment, leading to a decreased density, thereby affecting the properties of the high manganese steel. If the steel is water toughened, the carbides possibly distribute along crystalline boundaries, thereby decreasing steel toughness vastly.

Si: Si is added as an element for removing oxygen. Meanwhile, it has a function of strengthening solid solution and increasing yield strength.

Mn: Mn is the main alloy element in high manganese steel. Its functions include enlarging austenitic phase zone, stabilizing austenite, and reducing Ms point. Manganese can maintain an austenitic structure to room temperature. In addition to that which is solid-dissolved in austenite, a portion of manganese in steel exists in (Mn, Fe)C type carbides. If a manganese content is increased, both strength and toughness of the high manganese steel will increase, for the reason that manganese has an effect in enhancing intercrystalline bonding force. If the manganese content is too high, thermal conductivity of the steel will increase, and thus a transgranular structure tends to form, thereby affecting mechanical properties of the high manganese steel. To achieve stable mechanical properties, when carbon has a content of 0.9-1.5%, the manganese content is generally controlled in the range of 11-19%.

Al: Al is also an element for removing oxygen. Meanwhile, Al can also form fine, insoluble AlN particles with nitrogen, refining steel microstructure and inhibiting BN formation, so that B is still present in a solid solution state, thereby ensuring steel hardenability. Nevertheless, once an Al content exceeds 0.06%, coarse alumina inclusions will form in steel. Therefore, the Al content in the low-hardness layer is controlled in the range of 0.02-0.06%.

Still further, Mo may be further added into the above low-hardness layer in an amount of 0.90-1.80%.

The reason for further adding alloy element Mo into the low-hardness layer is that Mo can bond relatively strongly with iron, and Mo will not spread easily due to a relatively large atomic size of molybdenum. Therefore, few carbides precipitate in as-cast high manganese steel into which Mo is added, and the carbides do not present a network distribution on austenite grain boundaries. After water toughening treatment, molybdenum is solid-dissolved in austenite, and thus delays decomposition of austenite, which is advantageous for strength and toughness of high manganese steel.

Further, the dual-hardness clad steel plate according to the disclosure has an impact strength of no less than 50 J at −40° C.

Further, the high-hardness layer and the low-hardness layer described above has a thickness ratio of (0.43-3):1.

Another object of the disclosure is to provide a method of manufacturing a dual-hardness clad steel plate. This manufacture method can afford a clad steel plate comprising two surfaces having different hardness features, wherein one of the surfaces has an ultra-high hardness, and the other surface has a relatively low hardness and a relatively high low-temperature toughness. This manufacture method allows for a combination of high hardness, low hardness and high toughness in the same steel plate. In addition, the dual-hardness clad steel plate obtained by this manufacture method exhibits superior machinability and excellent bullet-proof performance.

In order to achieve the above inventive object, the method of manufacturing a dual-hardness clad steel plate according to the disclosure comprises the following steps:

(1) Preparing a high-hardness layer slab and a low-hardness layer slab respectively;

(2) Assembling slabs: pre-treating slab faces to be bonded, sealing a periphery around bonded faces of the slabs by welding, and subjecting a weld-sealed composite slab to vacuumizing treatment;

(3) Heating;

(4) Clad rolling;

(5) Cooling;

(6) Heat treatment: a heating temperature for heat treatment is 1050-1100° C.; a heating time is 2-3 min/mm×plate thickness; a heated clad plate is water cooled, wherein a water temperature is lower than 40° C., wherein the plate thickness has a unit of mm.

One key point to the method of manufacturing a dual-hardness clad steel plate according to the disclosure is atomic bonding of slabs having different hardness features by clad rolling. Another key point to the manufacture method is setting of the heating temperature in the heat treatment step to 1050-1100° C., so as to obtain a single homogeneous austenitic microstructure in the low-hardness layer slab. Cooling the heated clad plate with water having a temperature lower than 40° C. is aimed to water toughen the low-hardness layer slab of the clad plate, so as to obtain a single austenitic microstructure. At the same time, this heat treatment step is equivalent to quenching treatment for the high-hardness layer slab of the clad plate, so as to obtain a martensitic microstructure.

Further, in the above step (3), a heating temperature is 1130-1250° C., and a heating time is 120-180 min.

In step (3), control of the heating temperature in the range of 1130-1250° C. and the heating time in the range of 120-180 min is aimed to ensure that each of the assembled slabs should have a homogeneous alloy composition, so as to obtain a complete austenitic phase in the low-hardness layer, thereby reducing a yield stress of the slab, and thus reducing deformation resistance of a final clad steel plate.

Further, in the above step (4), a finishing rolling temperature is controlled in the range of 850–1000° C.

In step (4), setting of the finishing rolling temperature to ≥950° C. is also aimed to reduce the deformation resistance of the composite slab in the rolling stage.

The alloy ingredients in the technical solution of the disclosure are simple and readily controllable. The main ingredients include a medium content of carbon and low contents of alloying elements. Full advantage is taken of the solid solution strengthening effect of the alloy elements including C, Si, Mn, Cr, Ni, Cu, B and the like, as well as the function of the fine Ti(C, N) particles formed from the micro-alloying element Ti and elements C, N in refining austenitic grains. In the manufacture process, a dual-hardness clad steel plate having different hardness features is obtained by process steps of rolling, heat treatment, etc.

Additionally, the microstructure of the high-hardness layer in the dual-hardness clad steel plate according to the disclosure is martensite and a small amount of residual austenite, while the microstructure of the low-hardness layer in the dual-hardness clad steel plate according to the disclosure is purely austenite.

Additionally, a thickness ratio of the high-hardness layer to the low-hardness layer may be regulated in light of the circumstances in practical production. Thereafter, slabs may be assembled to produce a dual-hardness clad steel plate having a high hardness and a low hardness at the same time.

According to the method of the disclosure for manufacturing a dual-hardness clad steel plate, water toughening treatment of the low-hardness layer in the clad steel plate and quenching treatment of the high-hardness layer in the clad steel plate are fulfilled in the same process step of heat treatment.

The dual-hardness clad steel plate according to the disclosure has different surface hardnesses, wherein one surface has a Brinell hardness>600, and another surface has a Brinell hardness<250. The dual-hardness clad steel plate exhibits excellent bullet-proof performance, and it's able to meet the bullet-proof requirement imposed on steel plates by domestic armored vehicles.

In addition, the dual-hardness clad steel plate according to the disclosure has excellent low-temperature toughness, wherein its Charpy V longitudinal impact strength at −40° C. is not lower than 50 J.

In addition, the dual-hardness clad steel plate according to the disclosure also has good machinability, suitable for manufacture of bullet-proof vehicles and structural components thereof.

The method of manufacturing a dual-hardness clad steel plate according to the disclosure can provide a clad steel plate having different surface hardness features, and this steel plate exhibits excellent low-temperature toughness, superior bullet-proof performance and good machinability.

Additionally, the method of manufacturing a dual-hardness clad steel plate according to the disclosure is simple and easy to practice, suitable for steady production on production lines for medium- and large-thickness plates.

DETAILED DESCRIPTION

Figure 1:
FIG. 1 is a photograph showing a metallographic structure of the dual-hardness clad steel plate according to Example A4.

The dual-hardness clad steel plate and the manufacture method thereof according to the disclosure will be further explained and illustrated with reference to the accompanying drawings and the specific examples. Nonetheless, the explanation and illustration are not intended to unduly limit the technical solution of the disclosure.

Examples A1-A4

The dual-hardness clad steel plates in the Examples were manufactured with the following steps:

(1) Preparing high-hardness layer slabs and low-hardness layer slabs respectively, with the various chemical elements in the high-hardness layer slabs and low-hardness layer slabs being controlled as shown in Table 1;

(2) Assembling slabs:

(2a) the high-hardness layer slabs and low-hardness layer slabs were formed by bloom rolling in light of practical needs, wherein thicknesses of the slabs were determined by a thickness of a final dual-hardness clad steel plate and a thickness ratio of the high-hardness layer slab to the low-hardness layer slab;

(2b) slab faces to be bonded were pre-treated, wherein the bonding faces of the high-hardness layer and low-hardness layer slabs were processed respectively using a miller or planer to remove scales, slag inclusions and similar defects from the slab faces, and then a single face of each slab was cleaned, followed by chamfering four sides of the single face of the slab;

(2c) two cleaned slabs were placed together with cleaned face to cleaned face, and a periphery around the bonded faces of the slabs was sealed by welding;

(2d) a vacuum channel was left at a side of the slab after welding for subjecting the weld-sealed composite slab to vacuumizing treatment;

(3) Heating: a heating temperature was 1130-1250° C., and a heating time was 120-180 min;

(4) Clad rolling, with the finishing rolling temperature being controlled in the range of 850-1,000° C.;

(5) Cooling;

(6) Heat treatment: a heating temperature for the heat treatment was 1050-1100° C.; a heating time was 2-3 min/mm×plate thickness; a heated clad plate was water cooled on a roll table or in a water pool, wherein the water temperature was lower than 40° C.

Table 1 lists the mass percentages of the various chemical elements in the high-hardness layers and low-hardness layers of the dual-hardness clad steel plates in Examples A1-A6.

TABLE 1

(wt %, the balance is Fe and other unavoidable impurities)

| No. | Slab | C | Si | Mn | Al | Ni | Cr | Mo | Cu | Ti | B | Clad plate thickness (mm) | Thickness ratio of high-hardness layer to low-hardness layer |
|---|---|---|---|---|---|---|---|---|---|---|---|---|---|
| A1 | I* | 0.36 | 1.55 | 0.41 | 0.034 | 0.40 | 0.39 | 0.30 | 0.40 | 0.023 | 0.0015 | 6.5 | 2.25/1 |
|    | II* | 1.3 | 0.80 | 18 | 0.035 | / | / | / | / | / | / | | |
| A2 | I  | 0.38 | 0.95 | 0.64 | 0.047 | 0.55 | 0.94 | 0.55 | 0.26 | 0.034 | 0.0022 | 8 | 3/1 |
|    | II | 1.2 | 0.65 | 15 | 0.045 | / | / | 1.2 | / | / | / | | |
| A3 | I  | 0.40 | 1.36 | 0.80 | 0.038 | 0.46 | 0.46 | 0.28 | 0.55 | 0.034 | 0.0026 | 15 | 0.67/1 |
|    | II | 1.1 | 0.55 | 13 | 0.055 | / | / | / | / | / | / | | |
| A4 | I  | 0.39 | 1.45 | 0.95 | 0.042 | 0.33 | 0.76 | 0.34 | 0.48 | 0.015 | 0.0016 | 20 | 0.43/1 |
|    | II | 1.0 | 0.35 | 11 | 0.055 | / | / | / | / | / | / | | |
| A5 | I  | 0.42 | 1.45 | 0.95 | 0.042 | 0.33 | 0.76 | 0.34 | 0.48 | 0.015 | 0.0016 | 12 | 1/1 |
|    | II | 1.0 | 0.35 | 11 | 0.055 | / | / | 0.9 | / | / | / | | |
| A6 | I  | 0.41 | 1.45 | 0.95 | 0.042 | 0.33 | 0.76 | 0.34 | 0.48 | 0.015 | 0.0016 | 16 | 0.6/1 |
|    | II | 1.1 | 0.55 | 16 | 0.038 | / | / | 1.6 | / | / | / | | |

*Note: I represents high-hardness layer; II represents low-hardness layer.

Table 2 lists the specific process parameters in the manufacture method for the dual-hardness clad steel plates in Examples A1-A6.

TABLE 2

| | Step (3) | | Step (4) Finishing rolling temperature (° C.) | Step (6) | | |
|---|---|---|---|---|---|---|
| No. | Heating temperature (° C.) | Heating time (min) | | Heating temperature (° C.) | Heating time (min) | Water cooling temperature (° C.) |
| A1 | 1250 | 120 | 850 | 1050 | 19.5 | 20 |
| A2 | 1250 | 180 | 880 | 1060 | 24 | 22 |
| A3 | 1200 | 120 | 960 | 1080 | 38 | 25 |
| A4 | 1150 | 150 | 980 | 1090 | 40 | 30 |
| A5 | 1140 | 160 | 950 | 1075 | 30 | 24 |
| A6 | 1230 | 140 | 1000 | 1060 | 45 | 28 |

The dual-hardness clad steel plates in the above Examples were sampled for various mechanical properties tests. The relevant mechanical properties obtained in the tests are listed in Table 3. Meanwhile, the samples of the dual-hardness clad steel plates were subjected to shooting tests. The results of the tests are listed in Table 4.

Table 3 lists the parameters of the relevant mechanical properties of the dual-hardness clad steel plates in Examples A1-A4.

TABLE 3

| No. | Brinell hardness of high-hardness layer (HB10/3000) | Brinell hardness of low-hardness layer (HB10/3000) | Impact strength of clad steel plate KV2 (−40° C.)/J |
|---|---|---|---|
| A1 | 613 | 217 | 60 |
| A2 | 618 | 230 | 54 |
| A3 | 620 | 210 | 90 |
| A4 | 630 | 210 | 210 |
| A5 | 620 | 223 | 80 |
| A6 | 615 | 235 | 190 |

Note:
The impact samples for test plates in A1 and A2 had a size of 5 × 10 × 55 mm; and the impact samples for test plates in A3-A6 had a size of 10 × 10 × 55 mm. The position of an impact sample in a test plate in a direction of the cross-section along thickness was as follows: a sample was taken from the low-hardness layer side of a steel plate; a layer of 1 mm was removed from the steel plate surface; and then a longitudinal impact sample was machined. In the table, HB10/3000 represents a Brinell hardness value measured under a 3000 kg load using an indenter of 10 mm in diameter.

As can be seen from Table 3, each of the high-hardness layers of the dual-hardness clad steel plates in Examples A1-A6 has a Brinell hardness>613 HB; and each of the low-hardness layers has a Brinell hardness<250 HB. This indicates that the two surfaces of a clad steel plate in each example have different hardnesses, and this clad steel plate has two different hardness features at the same time. In addition, each of the dual-hardness clad steel plates in Examples A1-A6 has an impact strength KV2 (−40° C.)>50 J. This indicates that the clad steel plates in the above examples have good low-temperature toughness.

Table 4 lists the shooting test results of the dual-hardness clad steel plates in Examples A1-A4.

TABLE 4

| No. | Bullet type | Shooting distance (m) | Shooting velocity (m/s) | Result |
|---|---|---|---|---|
| A1 | M16 automatic rifle, 5.56 × 45 | 30 | 981/985/983 | Not shot through |
| A2 | M16 automatic rifle, 5.56 × 45 | 30 | 986/986/985 | Not shot through |
| A3 | M16 automatic rifle, 5.56 × 45 | 10 | 984/985/983 | Not shot through |
| A4 | M16 automation rifle, 5.56 × 45 | 10 | 986/984/987 | Not shot through |
| A5 | M16 automatic rifle, 5.56 × 45 | 10 | 976/981/982 | Not shot through |
| A6 | M16 automatic rifle, 5.56 × 45 | 10 | 971/975/973 | Not shot through |

As can be seen from Table 4, when the same type of bullets were used to shoot the steel plates in Examples A1-A6 from different shooting distances at substantially the same shooting velocity, none of the dual-hardness clad steel plates in Examples A1-A6 were shot through. This indicates that the steel plates in Examples A1-A6 have good bulletproof performance, and its bullet resistance meets the FB5 standard in EN.1063.

Figure 2:
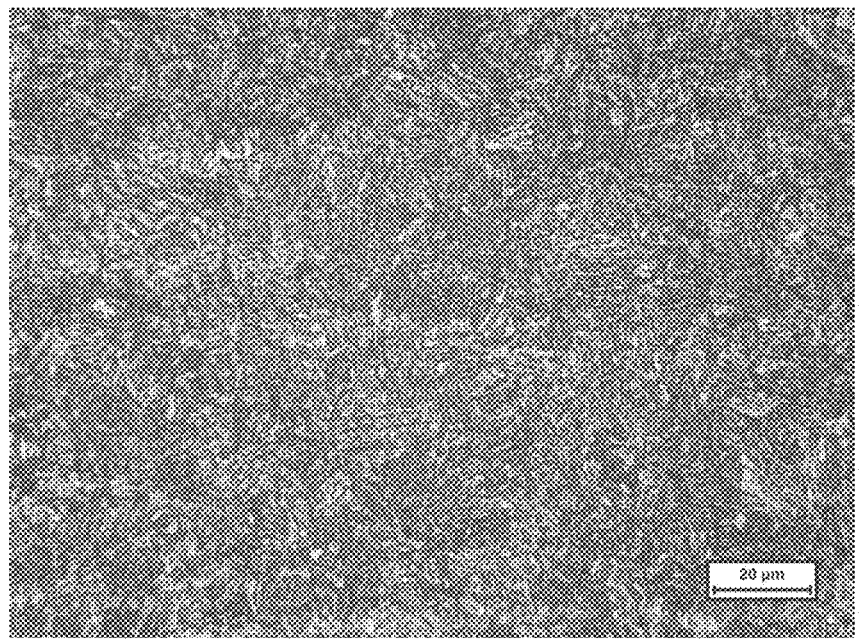
FIG. 2 is an image showing a microstructure of the high-hardness layer in the dual-hardness clad steel plate according to Example A4.

FIG. 1 shows a metallographic structure of the dual-hardness clad steel plate according to Example A4. In addition, FIG. 2 shows a microstructure of the high-hardness layer in the dual-hardness clad steel plate according to Example A4.

As can be seen from FIG. 1, this dual-hardness clad steel plate has a high-hardness layer and a low-hardness layer, wherein the upper layer is the high-hardness layer whose microstructure is martensite and a small amount of residual austenite; wherein the lower layer is the low-hardness layer whose microstructure is purely austenite. As can be seen from FIG. 2, nearly all of the microstructure of the high-hardness layer is martensite, with a proportion of the residual austenitic phase being lower than 1%.

It is to be noted that there are listed above only specific examples of the invention. Obviously, the invention is not limited to the above examples. Instead, there exist many similar variations. All variations derived or envisioned directly from the disclosure of the invention by those skilled in the art should be all included in the protection scope of the invention.

What is claimed is:

1. A dual-hardness clad steel plate, wherein one surface of the dual-hardness clad steel plate is a high hardness layer, and another surface thereof is a low hardness layer, wherein atomic bonding is realized between the high hardness layer and the low hardness layer by rolling, wherein the low hardness layer is Mn13 steel with a Brinell hardness lower than 250, and the high hardness layer has a Brinell hardness of greater than 600, wherein the high-hardness layer comprises the following chemical elements in mass percentage:

C: 0.35-0.45%, Si: 0.80-1.60%, Mn: 0.3-1.0%, Al: 0.02-0.06%, Ni: 0.3-1.2%, Cr: 0.30-1.00%, Mo: 0.20-0.80%, Cu: 0.20-0.60%, Ti: 0.01-0.05%, B: 0.001-0.003%, and a balance of iron and unavoidable impurities, and Wherein the low hardness layer comprises the following chemical elements in mass percentage:

C: 1.00-1.35%, Si: 0.30-0.90%, Mn: 11.0-19.0%, Al: 0.02-0.06%, and a balance of iron and unavoidable impurities.

2. The dual-hardness clad steel plate according to claim 1, wherein the high-hardness layer has a microstructure of martensite and a small amount of residual austenite.

3. The dual-hardness clad steel plate according to claim 2, wherein a proportion of the residual austenitic phase is less than 1%.

4. The dual-hardness clad steel plate according to claim 1, wherein the low-hardness layer further comprises Mo: 0.90-1.80%.

5. The dual-hardness clad steel plate according to claim 1, wherein the dual-hardness clad steel plate has an impact strength of no less than 50 J at −40° C.

6. The dual-hardness clad steel plate according to claim 1, wherein a thickness ratio of the high-hardness layer to the low-hardness layer is (0.43-3):1.

7. A method of manufacturing the dual-hardness clad steel plate according to claim 1, wherein the method comprises the following steps:

a. Preparing a high-hardness layer slab and a low-hardness layer slab respectively;

b. Assembling slabs: pre-treating slab faces to be bonded, sealing a periphery around bonded faces of the slabs by welding, and subjecting a weld-sealed composite slab to vacuumizing treatment;

c. Heating d. Clad rolling;

e. Cooling;

f. Heat treatment: a heating temperature for heat treatment is 1050-1100° C.; a heating time is 2-3 min/mm×plate thickness; a heated clad plate is water cooled, wherein a water temperature is lower than 40° C., wherein the plate thickness has a unit of mm.

8. The method of manufacturing the dual-hardness clad steel plate according to claim 7, wherein in the step c, a heating temperature is 1130-1250° C., and a heating time is 120-180 min.

9. The method of manufacturing the dual-hardness clad steel plate according to claim 8, wherein in the step d, a finishing rolling temperature is controlled in the range of 850-1000° C.

* * * * *